No. 746,894. PATENTED DEC. 15, 1903.
C. STERNBERGER & J. C. BUSCH.
CENTERING DEVICE FOR CUTTER AND BORING BARS.
APPLICATION FILED MAY 2, 1903.
NO MODEL.
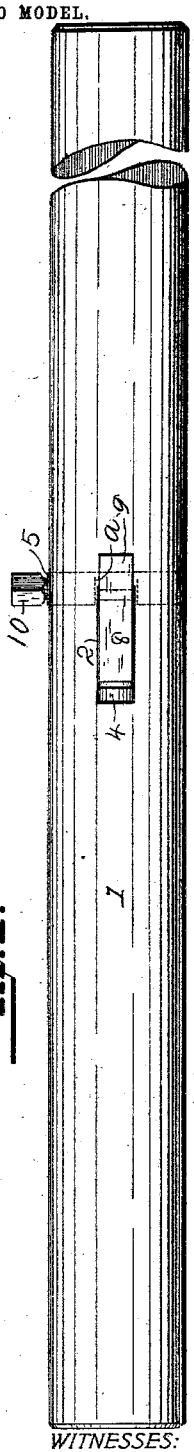
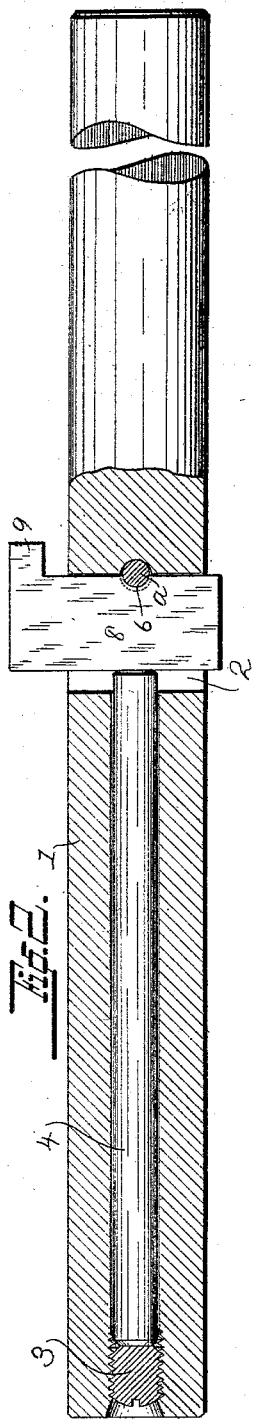
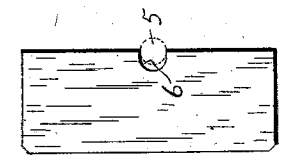
WITNESSES:
INVENTORS
Charles Sternberger
Julius C. Busch
BY
ATTORNEYS No. 746,894. Patented December 15, 1903.

UNITED STATES PATENT OFFICE.

CHARLES STERNBERGER AND JULIUS C. BUSCH, OF MILWAUKEE, WISCONSIN.

CENTERING DEVICE FOR CUTTER AND BORING BARS.

SPECIFICATION forming part of Letters Patent No. 746,894, dated December 15, 1903.

Application filed May 2, 1903. Serial No. 155,318. (No model.)

*To all whom it may concern:*

Be it known that we, CHARLES STERNBERGER and JULIUS C. BUSCH, citizens of the United States, residing at Milwaukee, county of Milwaukee, and State of Wisconsin, have invented new and useful Improvements in Centering Devices for Cutter and Boring Bars, of which the following is a specification.

Our invention relates to improvements in cutter and boring bars.

The object of our invention is to provide means for permanently locating the exact center line of a boring-bar and facilitating the adjustment of the cutters thereto, whereby various cutters may be used interchangeably in the bar without loss of time in centering them, each of the cutters being notched and adapted to engage a centering device fitting such notch.

In the following description reference is had to the accompanying drawings, in which—

Figure 1 is a view of our invention showing one end of a centering-gage substituted for the cutter and indicating the relation of the centering-pin thereto by dotted lines. Fig. 2 is a view at right angles to that of Fig. 1, drawn partly in central longitudinal section, and also showing the centering-gage. Fig. 3 is a side view of the cutter. Fig. 4 is a cross-sectional view of the bar drawn on the line of the centering-pin.

Like parts are identified by the same reference characters throughout the several views.

A supporting-bar 1 is provided with a cutter-receiving slot 2, from which a tubular aperture leads along the longitudinal center of the bar to one end, as shown in Fig. 2. At the outer end the walls of this aperture are threaded, and a nut 3 is used to lock the cutter in position through the medium of the rod 4. A centering-pin 5, inserted in a hole in the bar 1 at right angles to the slot 2, coöperates with the rod 4 in holding the cutter, the latter being provided with a notch 6 to fit the pin 5, as indicated by dotted lines in Fig. 3. The pin 5 is cylindrical in form; but that portion $a$ which crosses the cutter-receiving slot is of less diameter, and its center is out of line with the center of the other portions of the pin, thus forming an eccentric bearing for the cutter. As the cutter is forced against the pin by the rod 4 in order to center it, the rotation of the pin will gradually change the cutter adjustment transversely of the bar, and the latter can thus be centered with great nicety. To permanently adjust the pin for the purpose of locating the center of the bar, a gage-plate 8 is used, this being formed similar to the cutter, but with a lip 9 projecting parallel with the center line of the bar over the unslotted portion and adapted to facilitate the application of calipers. By inserting the gage first upon one side and then the other, applying the calipers, turning the pin, and again making the caliper tests the exact center of the boring-bar may be located. The pin 5 may then be riveted or otherwise permanently secured in position and the head 10 broken off.

While we have referred to the device shown in the drawings as a "boring-bar," the invention is equally applicable to cutter-bars, the construction being the same so far as it affects the invention claimed.

Having thus described our invention, what we claim as new, and desire to secure by Letters Patent, is—

1. In a tool of the described class, the combination of a slotted bar; a centering-pin mounted in the bar transversely to the plane of the slot, and provided with an eccentric portion exposed in the slot; a cutter formed to enter the slot, with one edge engaging the eccentric portion of the pin; means for binding the cutter against the pin; and means for effecting an original adjustment of the pin preparatory to the insertion of the cutters.

2. A boring-bar having a cutter-receiving slot; a cutter in said slot provided with a notch; a centering-pin extending through the bar at right angles to and along the edge of the slot; said pin being formed to project eccentrically into the slot; and adjustable means for pushing the cutter against the pin, whereby the position of the cutter is fixed by the engagement of the eccentric portion of the pin in said notch.

3. In a boring-bar having a cutter-receiving slot and an adjustable holding-rod for binding the cutter in position, a centering-pin having an eccentrically-formed central portion projecting into said slot, and adapted to fit a suitable notch in the cutter; said eccentric portion of the pin being adjusted across the center line of the bar and the pin being permanently secured in position.

4. The combination with a slotted boring-bar, of a centering-pin having a cylindrical center portion of reduced size eccentric to the axis of the pin and adjusted to cross the slot and center line of the bar; and means for pressing a notched cutter against the eccentric portion of the pin with said portion fitting the notch.

5. In a bar of the described class, a centering-pin having a cylindrical central portion of reduced size, and with its center line offset from that of the other portions of the pin, in combination with a centering-gage formed with a notch to fit the central portion of the pin, and provided with a lip parallel with the longitudinal center of the bar.

6. A bar of the described class, formed with a tool-receiving slot; a centering-pin crossing one edge of the slot, and having an eccentric central portion; a gage adapted for insertion in the slot and formed with a notch fitting the central portion of the pin; and a lip formed on the gage and projecting longitudinally of the bar along the unslotted portion thereof.

In testimony whereof we affix our signatures in the presence of two witnesses.

CHARLES STERNBERGER.
JULIUS C. BUSCH.

Witnesses:
JAS. B. ERWIN,
LEVERETT C. WHEELER.